(12) United States Patent
Chen et al.

(10) Patent No.: US 10,579,632 B2
(45) Date of Patent: Mar. 3, 2020

(54) PERSONALIZED CONTENT AUTHORING DRIVEN BY RECOMMENDATIONS

(71) Applicant: Microsoft Technology Licensing, LLC, Redmond, WA (US)

(72) Inventors: Crystal Chen, Mountain View, CA (US); Bo Xing, Fremont, CA (US); Yogesh M. Upadhyay, Milpitas, CA (US); Allen Arista Reyes, Fremont, CA (US); Shenghao Huang, Milpitas, CA (US); Nelson Mei, San Leandro, CA (US); Curtis C. Seaton, Concord, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 15/844,899

(22) Filed: Dec. 18, 2017

(65) Prior Publication Data

US 2019/0188272 A1 Jun. 20, 2019

(51) Int. Cl.
| | | |
|---|---|---|
| *G06F 17/30* | (2006.01) | |
| *G06F 16/2457* | (2019.01) | |
| *G06Q 50/00* | (2012.01) | |
| *H04L 29/08* | (2006.01) | |
| *G06N 20/00* | (2019.01) | |
| *G06F 16/9535* | (2019.01) | |

(52) U.S. Cl.
CPC .... *G06F 16/24578* (2019.01); *G06F 16/9535* (2019.01); *G06N 20/00* (2019.01); *G06Q 50/01* (2013.01); *H04L 67/22* (2013.01)

(58) Field of Classification Search
CPC .................................................. G06F 16/435

USPC .............................. 707/730; 706/46; 725/44
See application file for complete search history.

(56) References Cited

U.S. PATENT DOCUMENTS

| | | | |
|---|---|---|---|
| 10,114,824 B2 * | 10/2018 | Srinivasaraghavan | ...................... G06F 16/435 |
| 2012/0143798 A1 * | 6/2012 | Sundelin | .............. G06Q 10/107 706/12 |

(Continued)

OTHER PUBLICATIONS

Wikipedia: "Content Management System", downloaded from the Internet at https://en.wikipedia.org/wiki/Content_management_system May 16, 2018.

(Continued)

*Primary Examiner* — Baoquoc N To
(74) *Attorney, Agent, or Firm* — Park, Vaughan, Fleming & Dowler LLP; Chia-Hsin Suen

(57) ABSTRACT

The disclosed embodiments provide a system for personalizing content authoring. During operation, the system obtains interaction data containing interactions between a set of users and a set of features of a content management system (CMS). Next, the system tracks preferences of the users toward the features in a set of attributes representing the interaction data and a context associated with the interactions. During access to the CMS by a user, the system uses the attributes to identify other users that are similar to the user. Next, the system uses attributes for the user and the other users to calculate a set of weighted ratings between the user and the features. The system then generates output for prioritizing, for the user, the features within a user interface of the CMS according to the set of weighted ratings.

20 Claims, 5 Drawing Sheets

(56) References Cited

U.S. PATENT DOCUMENTS

| | | | |
|---|---|---|---|
| 2012/0143806 A1* | 6/2012 | Sundelin | G06N 20/00 706/21 |
| 2016/0147768 A1* | 5/2016 | Zheng | G06F 16/24578 707/730 |
| 2017/0083484 A1* | 3/2017 | Patil | G06F 17/218 |

OTHER PUBLICATIONS

Wikipedia: "Collaborative filtering", downloaded from the Internet at https://en.wikipedia.org/wiki/Collaborative_filtering#Memory-based May 17, 2018.

Wikipedia: "Nearest neighbor search", downloaded from the Internet at https://en.wikipedia.org/wiki/Nearest_neighbor_search May 17, 2018.

* cited by examiner

PERSONALIZED CONTENT AUTHORING DRIVEN BY RECOMMENDATIONS

BACKGROUND

Field

The disclosed embodiments relate to content management systems. More specifically, the disclosed embodiments relate to techniques for performing personalized content authoring driven by recommendations.

Related Art

Authors of articles, web pages, blogs, graphics, photos, audio, video, documents, reports, papers, and/or other digital content frequently use content management systems to create and publish the content. For example, a writer, developer, designer, researcher, and/or other type of author may select a template for creating a certain type of content within a content management system. Next, the author may use the template and features provided by the content management system to add text, images, audio, video, graphics, and/or other data to the content. After the author has finished creating the content, the author may use the content management system to publish the content to one or more servers, websites, and/or locations. The content management system may also allow the author to track edits to and/or versions of the content, manage permissions associated with the content, search for the content, and/or perform other management related to the content.

Consequently, creation and distribution of digital content may be facilitated by improving the functionality and flexibility of content management systems.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
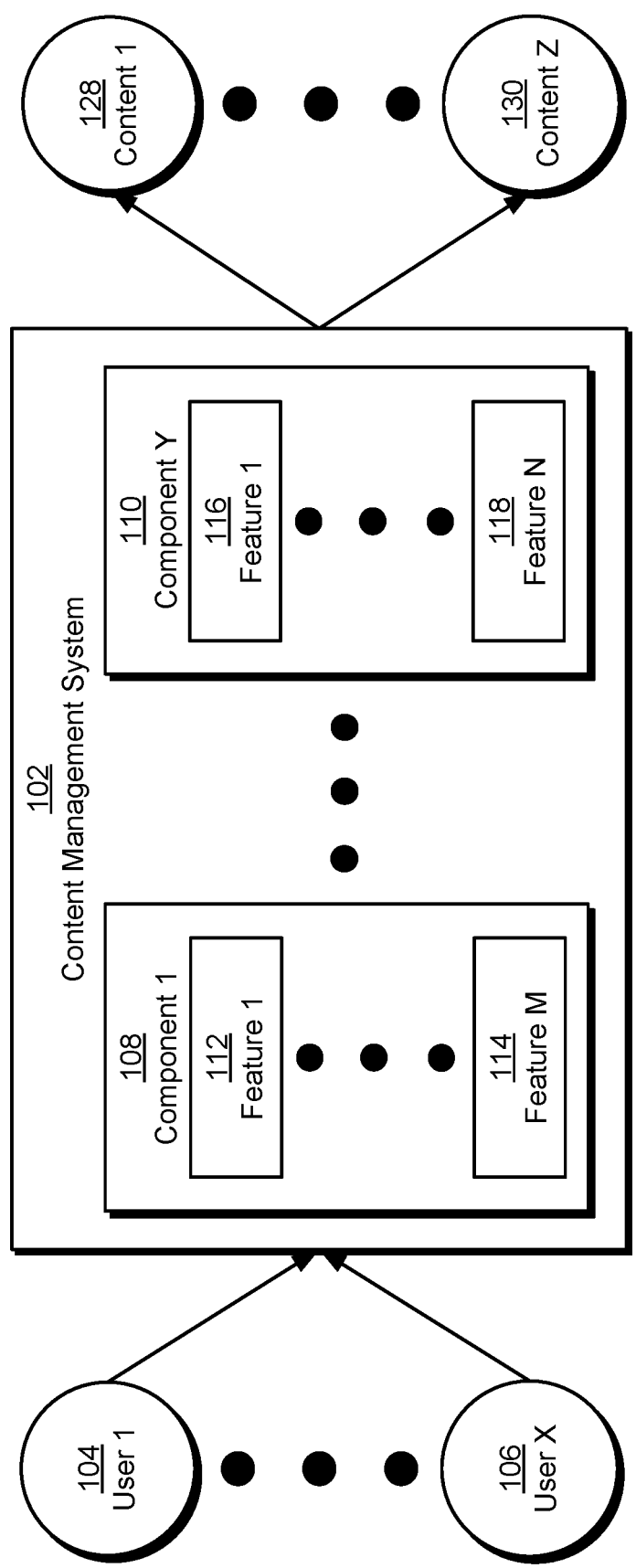
FIG. 1 shows a schematic of a system in accordance with the disclosed embodiments.

The disclosed embodiments provide a method and system for personalizing content authoring using recommendations. As shown in FIG. 1, a set of users (e.g., user 1 104, user x 106) may use a content management system (CMS) 102 to produce a set of content (e.g., content 1 128, content z 130). For example, the users may include writers, designers, illustrators, photographers, developers, musicians, architects, engineers, and/or other authors of digital content. The users may use CMS 102 to create, update, and/or publish images, video, audio, multimedia, documents, articles, blogs, web pages, computer aided design (CAD) drawings, architectural designs, logos, papers, and/or other types of digital content.

To create and/or modify content, the users may interact with multiple components (e.g., component 1 108, component y 110) in a user interface (e.g., graphical user interface, web-based user interface, etc.) of CMS 102 and/or multiple features within each component (e.g., feature 1 112 to feature m 114 in component 1 108, feature 1 116 to feature n 118 in component y 110). Each component may be a module, frame, widget, workflow, toolbar, screen, window, and/or other grouping of user-interface elements that is related to a certain type of functionality within CMS 102. Features in the component may include tools, options, menu items, buttons, checkboxes, and/or other sub-components for performing specific actions and/or specifying settings during the content-creation process. For example, CMS 102 may include components for accessing templates; color, shape, and text tools; page settings and metadata tools; image-processing tools; review, markup, approval, or publishing tools; search-engine optimization (SEO) settings; grammar and spell-checking tools; and/or search tools.

Those skilled in the art will appreciate that CMS 102 may include a large number of components and/or features that can be difficult for the users to locate or use. On the other hand, each user typically occupies a role that requires interaction with a small, specific subset of components and/or features during authoring, reviewing, and/or publishing of a certain type of content. As a result, CMS 102 may be associated with a steep learning curve that interferes with the efficient and effective creation of content and/or discovery of new or relevant features by the users.

In one or more embodiments, CMS 102 provides centralized content authoring and publishing for various types of content, content creators, and/or use cases while reducing overhead and complexity associated with accessing relevant or useful features. As described in further detail below, components and/or features of CMS 102 may be customized according to the preferences, behavior, and/or roles of users of CMS 102. Such customization may allow the users to easily locate and interact with features and/or components that are relevant to the users instead of requiring the users to manually learn and/or configure the locations and ordering of components and/or features within CMS 102.

Figure 2:
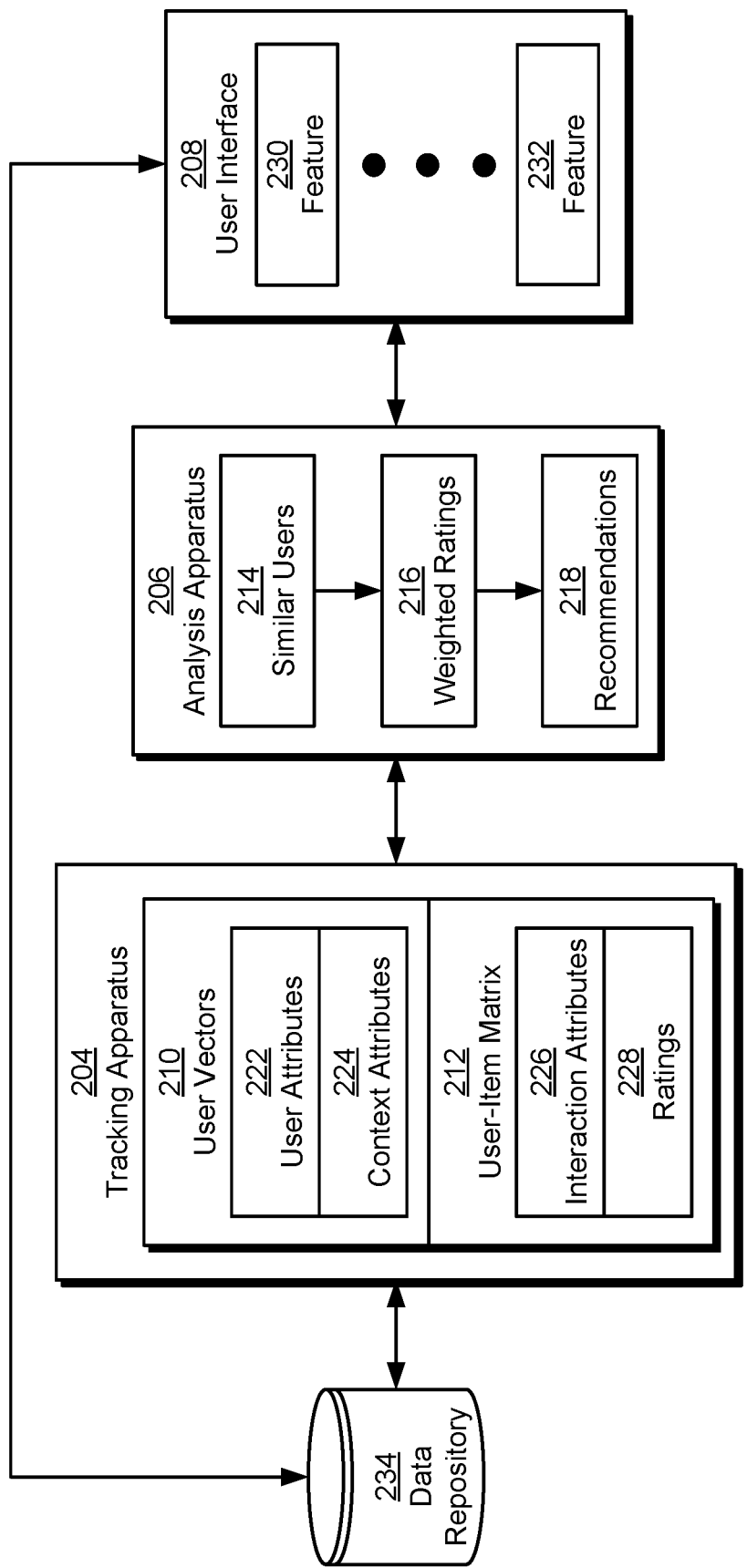
FIG. 2 shows a system for personalizing content authoring within a content management system in accordance with the disclosed embodiments.

FIG. 2 shows a system for personalizing content authoring within a CMS (e.g., CMS 102 of FIG. 1) in accordance with the disclosed embodiments. The system includes a tracking apparatus 204 and an analysis apparatus 206. Each of these components is described in further detail below.

Tracking apparatus 204 maintains a representation of user preferences toward features 230-232 displayed within a user interface 208 of the CMS. The user preferences may be obtained from data in a database, data store, distributed filesystem, messaging service, event stream, and/or another type of data repository 234.

More specifically, data in data repository 234 includes interaction data that captures interactions between a set of users and features 230-232 of the CMS. The interaction data may include records of the interactions that are generated in response to input from the users and/or corresponding output from the CMS. For example, the interaction data may include records of clicks, searches, views, text input, cursor input, stylus input, creating new files, opening existing files, saving files, page loads, function calls, database queries, and/or other activity received from the users or performed in response to input from the users. Each record may include fields that identify a user, a feature of the CMS, a component containing the feature, a type of interaction between the user and feature, a time of the interaction, a duration of the interaction, a type of content associated with the interaction, and/or other information that pertains to a given interaction between the user and the feature.

The interaction data may also, or instead, include interactions from other CMSes and/or explicit or implicit user preferences related to usage of the CMSes. For example, the interaction data may include records of usage on the other CMSes, results of focus group studies, and/or other types of usage data or research results.

Tracking apparatus 204 obtains the interaction data from data repository 234 and/or another source and tracks and/or standardizes the corresponding interactions and/or preferences using a set of attributes. The attributes include user attributes 222, context attributes 224, and/or interaction attributes 226.

User attributes 222 include standardized information related to users involved in the interactions. For example, user attributes 222 may include names, job titles, roles, departments, levels of experience with using the CMS, permissions, and/or other attributes that are user-specific and relevant to usage of the CMS. User attributes 222 may be obtained by matching user identifiers in the interaction data to user profiles of the users (e.g., from social networks, user accounts, corporate directories, etc.). User attributes 222 may also, or instead, be provided by the users during creation of user accounts with the CMS and/or research involving usage of the CMS or other CMSes by the users.

Context attributes 224 may track contexts associated with usage of the CMS by the users. For example, context attributes 224 may include platforms (e.g., mobile, desktop, web, etc.) or devices (e.g., mobile phones, tablet computers, laptop computers, desktop computers, etc.) used by the users to access the CMS, the locations of the users, and/or other attributes that may affect the ways in which the users interact with the CMS.

Interaction attributes 226 include standardized data for tracking interactions between the users and features 230-232. For example, interaction attributes 226 may include a number of interactions between a user and a feature, a frequency of the interactions, a duration of each interaction, and/or a time of each interaction.

As shown in FIG. 2, tracking apparatus 204 stores user attributes 222, context attributes 224, and interaction attributes 226 in a number of structures. User attributes 222 and context attributes 224 may be included in user vectors 210 for the corresponding users. For example, each user may be represented by one or more user vectors 210, such as a different user vector for each unique context in which the user accesses the CMS. Elements in each user vector may include encoded user attributes 222 (e.g., name, user identifier, job title, location, role, etc.) and encoded context attributes 224 (e.g. platform, device, permissions, etc.) for a given type or instance of access to the CMS by the corresponding user.

Interaction attributes 226 may be stored in a user-item matrix 212 for the CMS and/or a given component in the CMS. User-item matrix 212 may include a multidimensional encoding of interaction attributes 226 for interactions between the users and features 230-232 in the component and/or CMS. For example, rows of user-item matrix 212 may represent distinct users, usage contexts, and/or user vectors 210, and columns of user-item matrix 212 may represent features 230-232 in one or more components of the CMS. Each element in user-item matrix 212 may include an array, vector, and/or other structure for storing multiple interaction attributes 226 (e.g., number of interactions, frequency of interactions, duration of interactions, time of interactions, etc.) associated with the corresponding user and feature.

User attributes 222, context attributes 224, and/or interaction attributes 226 may further be used to calculate a set of ratings 228 between the users and features 230-232. Each rating may represent the preference of an individual user toward a given feature with respect to a given usage context. For example, ratings 228 may include numeric scores between the users and features 230-232, with a higher score indicating a stronger user preference for or interest in a given feature within a usage context and a lower score indicating a weaker user preference for or interest in the feature within the usage context.

After a rating is calculated from the corresponding attributes for a given user, usage context, and feature, the rating may be stored with interaction attributes 226 in an element representing the user, usage context, and feature within user-item matrix 212. For example, the rating may be appended to the end of a vector containing interaction attributes 226 that is stored in and/or referenced by an element of user-item matrix 212 that represents the user, usage context, and feature.

To calculate ratings 228, tracking apparatus 204 and/or another component of the system may combine user attributes 222, context attributes 224, and/or interaction attributes 226 with a set of weights. For example, the component may calculate each rating by combining interaction attributes 226 for a given user-feature pair with a set of weights that reflect the relative importance of interaction attributes 226 in determining the rating. Thus, an attribute that better represents the users' preferences toward one or more features 230-232 (e.g., frequency of interaction) may have a higher weight than an attribute that is less representative of the users' preferences toward the feature(s) (e.g., duration of interaction).

Weights used to calculate ratings 228 may optionally be adjusted in response to subsequent interactions between the users and features 230-232 and/or feedback from the users. For example, the weights may be tuned by a statistical model to generate ratings 228 that better represent the proportional usage of the corresponding features 230-232 by the users and/or user-provided ratings of features 230-232.

Weights used to calculate ratings 228 may further be adjusted to reflect the recency of the corresponding user attributes 222, context attributes 224, and/or interaction attributes 226. For example, the weights may emphasize recent interactions over older interactions in ratings 228 and/or combinations of user attributes 222 and/or context attributes 224 from more recent user sessions over those of older user sessions.

As mentioned above, user interface 208 may be customized to the behavior, role, interests, and/or preferences of each user. To perform such customization, analysis apparatus 206 uses user vectors 210 to identify a set of similar users 214 for a user accessing the CMS. For example, analysis apparatus 206 may map user attributes 222 and context attributes 224 from user vectors 210 to a multidimensional space and calculate distances between the user and other users in the multidimensional space using cosine similarities, Euclidean distances, vector decompositions, and/or other measures of similarity or distance. Thus, users that have greater overlap in user attributes 222 (e.g., roles, job titles, functions, etc.) and/or context attributes 224 (e.g., platforms, devices, permissions, locations, etc.) may have more similarity than users with less overlap in user attributes 222 and/or context attributes 224. As with calculation of ratings 228, measures of similarity among users may be calculated using weights that scale user attributes 222 and/or context attributes 224 according to their relative importance.

After measures of similarity are calculated between a user and other users, analysis apparatus 206 selects similar users 214 based on one or more thresholds. For example, analysis apparatus 206 may obtain similar users 214 as a prespecified number of users that are most similar to the user and/or a set of users that are within a certain threshold of similarity to the user.

Analysis apparatus 206 then calculates a set of weighted ratings 216 for features 230-232 using ratings 228 for the user and similar users 214. Each weighted rating may be a weighted average of ratings 228 from the user and similar users 214 for a given feature. Weights used to calculate the weighted rating may reflect the measures of similarity between the user and similar users 214. For example, the weights may include distances between the user and similar users 214 in a multidimensional space to which user attributes 222 and context attributes 224 of the users are mapped. In another example, the weights may be proportional to the distances and/or other measures of similarity between the user and similar users 214. In a third example, the weights may be selected and/or adjusted so that the user's ratings 228 contribute a certain percentage or proportion to weighted ratings 216 and ratings 228 from similar users 214 contribute the remaining percentage or proportion to weighted ratings 216. In a fourth example, the weights may be set according to some or all of the previously discussed techniques.

Finally, analysis apparatus 206 uses weighted ratings 216 to generate output for prioritizing features 230-232 within user interface 208. For example, analysis apparatus 206 may order features 230-232 in a given component of user interface 208 by the corresponding weighted ratings 216 and select a subset of features 230-232 with the highest weighted ratings 216 as recommendations 218 for inclusion in the component. Analysis apparatus 206 and/or another component of the system and/or CMS may then display features 230-232 in user interface 208 according to recommendations 218 (e.g., by displaying recommended features and/or features with high weighted ratings 216 more prominently than other features in the same component).

Consequently, features 230-232 in user interface 208 and/or one or more components of user interface 208 may be customized to the role, usage patterns, and/or preferences of the user. For example, designers that frequently perform design audits may be shown color, shape, and text tools in more prominent parts of user interface 208. In another example, recommendations 218 for SEO analysts may include page settings and metadata tools. In a third example, users that function as editors may gradually see tools for approving and/or publishing content as more content is published through the CMS.

After features 230-232 and/or other features are displayed within user interface 208, subsequent interactions between the user and the features are recorded and stored in data repository 234. In turn, tracking apparatus 204 obtains the interactions from data repository 234 and updates user attributes 222, context attributes 224, interaction attributes 226, and/or ratings 228 based on the interactions. For example, tracking apparatus 204 may update context attributes 224 with the most recent platform and/or device used by the user to access the CMS. In another example, tracking apparatus 204 may include, in context attributes 224 or another portion of the user vector for the user, some or all of the most recent set of recommendations 218 generated for the user. The included recommendations 218 may subsequently be used by analysis apparatus 206 to identify similar users 214, in lieu of or in addition to other user attributes 222 and/or context attributes 224 in the corresponding user vectors 210. In a third example, tracking apparatus 204 may add the interactions to interaction attributes 226 in user-item matrix 212 and calculate new ratings 228 for the corresponding features from interaction attributes 226.

By surfacing features 230-232 that match usage patterns, behaviors, roles, and/or preferences of the users, the system of FIG. 2 may reduce overhead associated with finding relevant features 230-232, learning to use the CMS, introducing new features 230-232 into the CMS, and/or customizing user interface 208. In turn, continued interaction of the users with the CMS may improve the accuracy and/or relevance of recommendations 218 while allowing user interface 208 to evolve in response to changes in the users' behavior, usage, and/or experience. Moreover, the generation of recommendations 218 from weighted ratings 216 that are created from attributes for multiple similar users 214 may allow customization of user interface 208 for new users that lack previous interaction with the CMS while reducing overfitting associated with recommending items or features 230-232 based on the preferences or interactions of a single user. Consequently, the system may improve the ease of use, relevance, and/or user experience associated with computer systems, development tools, and/or technologies for creating, modifying, editing, managing, and/or publishing content.

Those skilled in the art will appreciate that the system of FIG. 2 may be implemented in a variety of ways. First, tracking apparatus 204, analysis apparatus 206, user interface 208, data repository 234, and/or other components of the system or CMS may be provided by a single physical machine, multiple computer systems, one or more virtual machines, a grid, one or more databases, one or more filesystems, and/or a cloud computing system. Tracking apparatus 204, analysis apparatus 206, and/or user interface 208 may additionally be implemented together and/or separately by one or more hardware and/or software components and/or layers.

Second, various components of the system may be configured to execute in an offline, online, and/or nearline basis to perform different types of processing related to customizing user interface 208 for users of the CMS. For example, a number of batch-processing and/or offline jobs may execute on a periodic (e.g., daily) basis to identify a set of similar users 214 for each user of the CMS. Conversely, a online and/or nearline process may be used to identify similar users 214 for a new user of the CMS so that the system can customize user interface 208 for the new user while the new user interacts with user interface 208 and/or uses the CMS.

Third, a number of techniques may be used to identify or select one or more features 230-232 as recommendations 218 based on interaction data and/or contextual data for the users. For example, similar users 214, ratings 228, weighted ratings 216, and/or other factors used to identify recommendations 218 may be calculated and/or identified using support vector machines (SVMs), artificial neural networks (ANNs), naïve Bayes classifiers, decision trees, random forests, regression models, deep learning models, classification techniques, matrix factorization techniques, clustering techniques, collaborative filtering techniques, and/or other statistical models or machine learning techniques. The retraining or execution of the statistical models may also be performed on an offline, online, and/or on-demand basis to accommodate requirements or limitations associated with the processing, performance, or scalability of the system.

Figure 3:
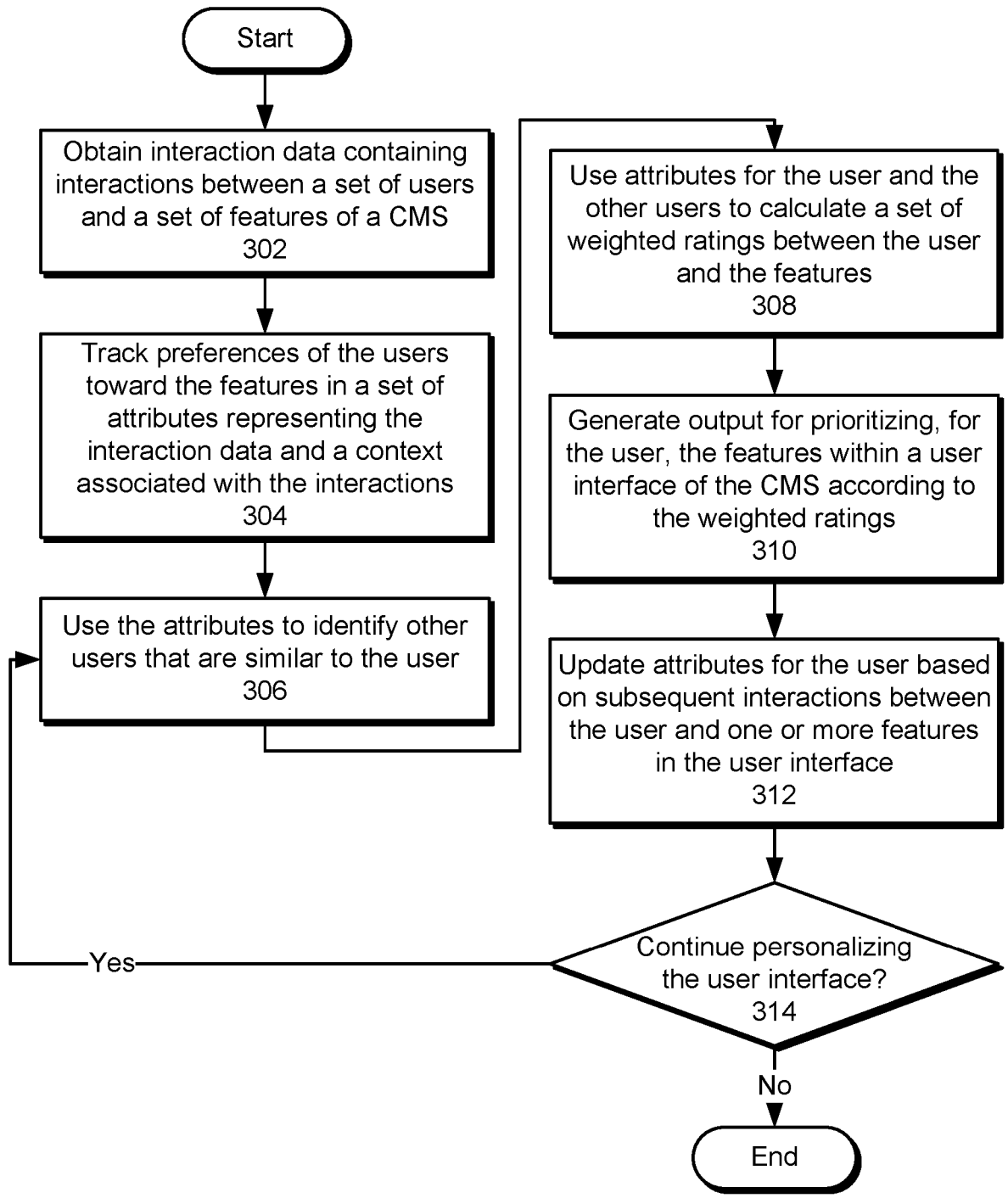
FIG. 3 shows a flowchart illustrating a process of personalizing content authoring within a content management system in accordance with the disclosed embodiments.

FIG. 3 shows a flowchart illustrating a process of personalizing content authoring within a CMS in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, interaction data containing interactions between a set of users and a set of features of the CMS is obtained (operation 302). For example, the interaction data may include events and/or records of clicks, keyboard input, touch input, drawing input, mouse input, voice input, and/or other types of input generated by the users during use of the corresponding features. The interaction data may also, or instead, include results of focus group studies and/or other research on usage patterns of CMSes.

The interaction data may further be matched to a component containing the features, such as a module, widget, toolbar, screen, workflow, frame, and/or other portion of the user interface of the CMS. For example, the interaction data may be obtained by querying a database and/or other data store for records of interactions between the users and features that are displayed or accessed within a given component of the user interface.

Next, preferences of the users toward the features are tracked in a set of attributes representing the interaction data and a context associated with the interactions (operation 304). For example, the users, features, interactions, data, and context may be standardized within attributes that are stored in one or more user vectors and/or user-item matrices. Attributes representing the context may include a platform used to access the CMS (e.g., desktop, mobile, web, device, operating system, etc.), a user attribute (e.g., name, location, role, job title, level of experience with the CMS, etc.), and/or a set of previous recommendations (e.g., features identified as most relevant to the users). Attributes representing the interaction data may include a number of interactions with a feature of the CMS, a frequency of the interactions, a time of each interaction, and/or a duration of each interaction.

The attributes are then used to identify other users that are similar to the user (operation 306). For example, the attributes may be mapped to a multidimensional space, and the similar users may be identified based on distances between the user and other users in the multidimensional space. The similar users may thus include a subset of users that are closer to the user within the multidimensional space.

Attributes for the user and the other users are also used to calculate a set of weighted ratings between the user and the features (operation 308), as described in further detail below with respect to FIG. 4. Output for prioritizing, for the user, the features within a user interface of the CMS is then generated according to the weighted ratings (operation 310). For example, the features may be ordered by the weighted ratings, and a subset of features with the highest weighted ratings in the ordering (e.g., the top 3 features) may be outputted as recommendations for inclusion in the user interface. A rendering component of the CMS may then generate the user interface so that recommended features are displayed more prominently and/or are easier to access than non-recommended features.

Finally, attributes for the user are updated based on subsequent interactions between the user and one or more features in the user interface (operation 312). For example, the user's interactions with recommended and/or non-recommended features may be tracked in the corresponding attributes, and the context of the user's interactions (e.g., devices, platforms, locations, time, etc.) may be maintained in one or more user vectors for the user.

Personalization of the user interface may continue (operation 314) during use of the CMS by the users. When a given user accesses the CMS, attributes of the users are used to identify similar users (operation 306), calculate weighted ratings between the user and the features (operation 308), and output recommendations of features (operation 310). The user's interaction with the CMS may additionally be tracked in the corresponding attributes (operation 312) to improve subsequent recommendations and/or user interface customizations for the user and other users. Personalization of the user interface may thus continue until the CMS and/or components of the CMS containing the features are no longer used.

Figure 4:
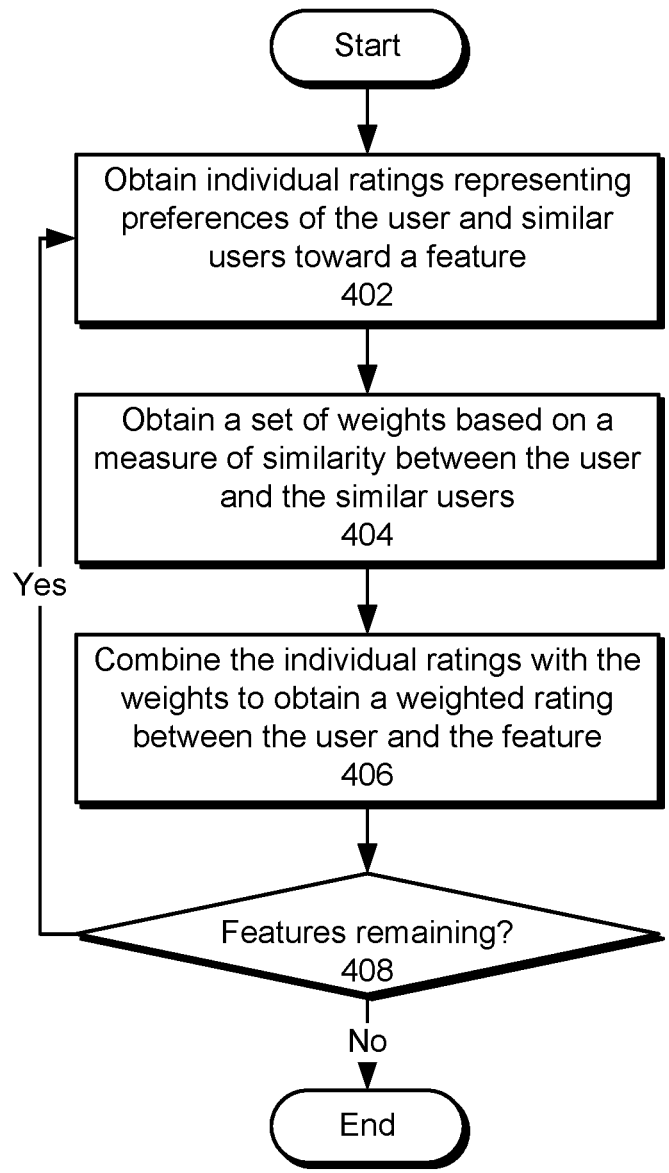
FIG. 4 shows a flowchart illustrating a process of calculating a set of weighted ratings between a user and a set of features in a user interface of a content management system in accordance with the disclosed embodiments.

FIG. 4 shows a flowchart illustrating a process of calculating a set of weighted ratings between a user and a set of features in a user interface of a CMS in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, individual ratings representing preferences of the user and similar users toward a feature are obtained (operation 402). For example, the individual ratings may be obtained from a user-item matrix that is used to track user preferences toward features in a CMS. To calculate each individual rating, attributes (e.g., interaction attributes, context attributes, user attributes, etc.) associated with the corresponding user and feature may be obtained from the user-item matrix and combined with weights representing the relative contributions of the attributes to the individual rating.

Next, a different set of weights is obtained based on a measure of similarity between the user and similar users (operation 404). For example, weights obtained in operation 404 may reflect distances between the user and the similar users in a multidimensional space into which the users' attributes and/or contexts are mapped. The individual ratings are then combined with the weights to obtain a weighted rating between the user and the feature (operation 406). For example, the weighted rating may be calculated as a linear combination of the individual ratings multiplied by the corresponding weights.

Operations 402-406 may be repeated for remaining features (operation 408) within a component of the user interface. For example, the individual ratings and weights may be used to calculate a separate weighted rating for each feature shown within a widget, module, screen, workflow, toolbar, and/or other component in the user interface. After the weighted ratings are calculated for all features in the component, the weighted ratings are used to prioritize some of the features within the component, as discussed above.

Figure 5:
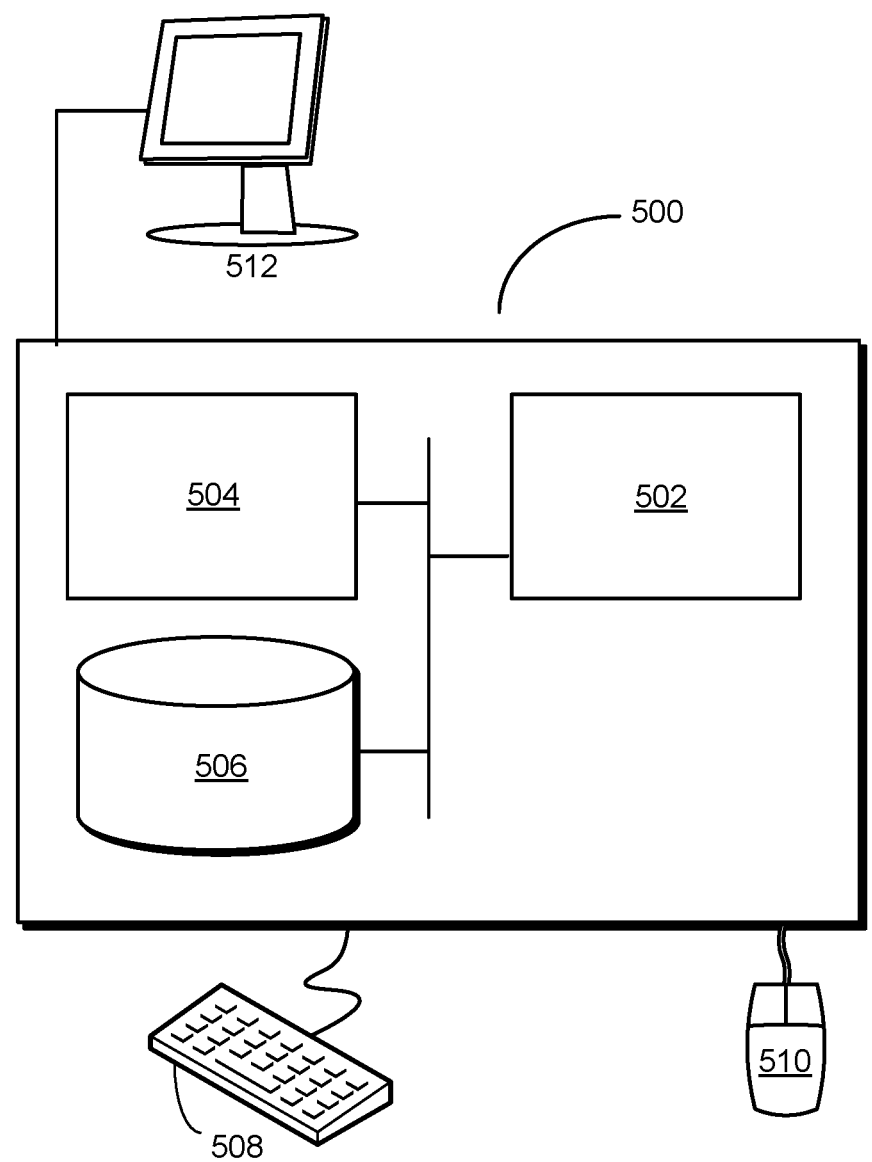
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for personalizing content authoring within a CMS. The system includes a tracking apparatus and an analysis apparatus, one or more of which may alternatively be termed or implemented as a module, mechanism, or other type of system component. The tracking apparatus obtains interaction data containing interactions between a set of users and a set of features of the CMS. Next, the tracking apparatus tracks preferences of the users toward the features in a set of attributes representing the interaction data and a context associated with the interactions.

To personalize access to the CMS by a user, the analysis apparatus uses the attributes to identify a subset of users that are similar to the user. Next, the analysis apparatus uses a first subset of the attributes for the user and the similar users to calculate a set of weighted ratings between the user and the features. The analysis apparatus then generates output for prioritizing, for the user, the features within a user interface of the CMS according to the set of weighted ratings.

In addition, one or more components of computer system 500 may be remotely located and connected to the other components over a network. Portions of the present embodiments (e.g., tracking apparatus, analysis apparatus, data repository, CMS, user interface, etc.) may also be located on different nodes of a distributed system that implements the embodiments. For example, the present embodiments may be implemented using a cloud computing system that customizes the user interface of a CMS for a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining interaction data comprising interactions between a set of users and a set of features of a content management system (CMS);
tracking preferences of the set of users toward the set of features in a set of attributes representing the interaction data and a context associated with the interactions; and
personalizing access to the CMS by a user by performing the following operations on the one or more computer systems:
using the set of attributes to identify a subset of the users that are similar to the user;
using a first subset of the attributes for the user and the subset of the users to calculate a set of weighted ratings between the user and the set of features; and
generating output for prioritizing, for the user, the set of features within a user interface of the CMS according to the set of weighted ratings;
wherein using the first subset of the attributes for the user and the subset of the users to calculate the set of weighted ratings between the user and the set of features comprises:
obtaining, for each feature in the set of features, a set of individual ratings representing preferences of the user and the subset of the users toward the feature; and
combining the set of individual ratings with a set of weights to obtain a weighted rating between the user and the feature.

2. The method of claim 1, further comprising:
updating a second subset of the attributes for the user based on subsequent interactions between the user and one or more features in the user interface.

3. The method of claim 2, wherein the second subset of the attributes is updated within a set of elements associated with the user and the subset of features in a user-item matrix for the CMS.

4. The method of claim 1, wherein using the set of attributes to identify the subset of the users that are similar to the user comprises:
   mapping the set of attributes to a multidimensional space; and
   identifying the subset of users based on distances between the user and other users in the multidimensional space.

5. The method of claim 1, wherein using the first subset of the attributes for the user and the subset of the users to calculate the set of weighted ratings between the user and the set of features further comprises:
   obtaining the set of weights based on a measure of similarity between the user and the subset of the users.

6. The method of claim 1, wherein obtaining the set of individual ratings comprises:
   combining a second subset of attributes associated with the user and the feature with an additional set of weights to obtain an individual rating between the user and the feature.

7. The method of claim 1, wherein obtaining the interaction data comprises:
   matching the interaction data to a component containing the set of features within the CMS.

8. The method of claim 1, wherein tracking the preferences of the set of users toward the set of features comprises:
   standardizing the set of users, the set of features, the interaction data, and the context within the set of attributes.

9. The method of claim 1, wherein generating the output for prioritizing, for the user, the set of features within the user interface of the CMS according to the set of weighted ratings comprises:
   ordering the set of features by the set of weighted ratings; and
   outputting a subset of features with highest weighted ratings from the ordered set of features as recommendations for inclusion in the user interface.

10. The method of claim 1, wherein the context is represented in the set of attributes using at least one of:
    a platform used to access the CMS;
    a user attribute; and
    a set of previous recommendations.

11. The method of claim 1, wherein the interaction data is represented in the set of attributes using at least one of:
    a number of interactions with a feature of the CMS;
    a frequency of the interactions;
    a time of an interaction with the feature; and
    a duration of the interaction.

12. A system, comprising:
    one or more processors; and
    memory storing instructions that, when executed by the one or more processors, cause the system to:
       obtain interaction data comprising interactions between a set of users and a set of features of a content management system (CMS);
       track preferences of the set of users toward the set of features in a set of attributes representing the interaction data and a context associated with the interactions; and
       personalizing access to the CMS by a user by:
          using the set of attributes to identify a subset of the users that are similar to the user;
          using a first subset of the attributes for the user and the subset of the users to calculate a set of weighted ratings between the user and the set of features; and
          generating output for prioritizing, for the user, the set of features within a user interface of the CMS according to the set of weighted ratings;
    wherein using the first subset of the attributes for the user and the subset of the users to calculate the set of weighted ratings between the user and the set of features comprises:
       obtaining, for each feature in the set of features, a set of individual ratings representing preferences of the user and the subset of the users toward the feature; and
       combining the set of individual ratings with a set of weights to obtain a weighted rating between the user and the feature.

13. The system of claim 12, wherein the memory further stores instructions that, when executed by the one or more processors, cause the system to:
    update a second subset of the attributes for the user based on subsequent interactions between the user and one or more features in the user interface.

14. The system of claim 12, wherein using the first subset of the attributes for the user and the subset of the users to calculate the set of weighted ratings between the user and the set of features further comprises:
    obtaining the set of weights based on a measure of similarity between the user and the subset of the users.

15. The system of claim 12, wherein obtaining the set of individual ratings comprises:
    combining a second subset of attributes associated with the user and the feature with an additional set of weights to obtain an individual rating between the user and the feature.

16. The system of claim 12, wherein generating the output for prioritizing, for the user, the set of features within the user interface of the CMS according to the set of weighted ratings comprises:
    ordering the set of features by the set of weighted ratings; and
    outputting a subset of features with highest weighted ratings from the ordered set of features as recommendations for inclusion in the user interface.

17. The system of claim 12, wherein the context is represented in the set of attributes using at least one of:
    a platform used to access the CMS;
    a user attribute; and
    a set of previous recommendations.

18. The system of claim 12, wherein the interaction data is represented in the set of attributes using at least one of:
    a number of interactions with a feature of the CMS;
    a frequency of the interactions;
    a time of an interaction with the feature; and
    a duration of the interaction.

19. A non-transitory computer-readable storage medium storing instructions that when executed by a computer cause the computer to perform a method, the method comprising:
    obtaining interaction data comprising interactions between a set of users and a set of features of a content management system (CMS);
    tracking preferences of the set of users toward the set of features in a set of attributes representing the interaction data and a context associated with the interactions; and
    personalizing access to the CMS by a user by performing the following operations:
       using the set of attributes to identify a subset of the users that are similar to the user;

using a first subset of the attributes for the user and the subset of the users to calculate a set of weighted ratings between the user and the set of features; and generating output for prioritizing, for the user, the set of features within a user interface of the CMS according to the set of weighted ratings;

wherein using the first subset of the attributes for the user and the subset of the users to calculate the set of weighted ratings between the user and the set of features comprises:

obtaining, for each feature in the set of features, a set of individual ratings representing preferences of the user and the subset of the users toward the feature; and combining the set of individual ratings with a set of weights to obtain a weighted rating between the user and the feature.

20. The non-transitory computer-readable storage medium of claim 19, wherein the method further comprises:

updating a second subset of the attributes for the user based on subsequent interactions between the user and one or more features in the user interface.

\* \* \* \* \*